(12) United States Patent
Mukainakano

(10) Patent No.: US 11,396,329 B2
(45) Date of Patent: Jul. 26, 2022

(54) FIBER-REINFORCED RESIN COMPOSITE AND MANUFACTURING METHOD OF FIBER-REINFORCED RESIN COMPOSITE

(71) Applicant: SUBARU CORPORATION, Tokyo (JP)

(72) Inventor: Yuya Mukainakano, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/943,266

(22) Filed: Jul. 30, 2020

(65) Prior Publication Data

US 2021/0094243 A1 Apr. 1, 2021

(30) Foreign Application Priority Data

Sep. 26, 2019 (JP) .............................. JP2019-176137

(51) Int. Cl.
*B62D 25/04* (2006.01)
*B29C 70/22* (2006.01)
*B29C 70/34* (2006.01)
*B62D 29/04* (2006.01)
*B29L 31/30* (2006.01)
*B62D 25/00* (2006.01)

(52) U.S. Cl.
CPC ............ *B62D 25/04* (2013.01); *B29C 70/222* (2013.01); *B29C 70/34* (2013.01); *B62D 29/04* (2013.01); *B29L 2031/30* (2013.01); *B62D 25/00* (2013.01)

(58) Field of Classification Search
CPC ...... B62D 25/04; B62D 25/00; B29C 70/222; B29C 70/86; B29C 70/32
USPC ........................................ 296/193.06, 901.01
See application file for complete search history.

(56) References Cited

U.S. PATENT DOCUMENTS

| 9,290,212 | B2 * | 3/2016 | Zaluzec | .................. | B32B 5/024 |
| 9,365,244 | B2 * | 6/2016 | Appasamy | ............ | B62D 29/043 |
| 10,052,851 | B2 * | 8/2018 | Cho | .......................... | B32B 15/04 |
| 2014/0367981 | A1 * | 12/2014 | Zaluzec | .................. | B32B 37/16 |
| | | | | | 293/121 |

FOREIGN PATENT DOCUMENTS

JP 2005225364 A 8/2005

* cited by examiner

*Primary Examiner* — Dennis H Redder
(74) *Attorney, Agent, or Firm* — Troutman Pepper Hamilton Sanders LLP

(57) ABSTRACT

A fiber-reinforced resin composite configured to be to be used for a vehicle body structure has a cylindrical shape and a longitudinal direction. The fiber-reinforced resin composite includes first fibers and second fibers. The first fibers are disposed along an axial direction of the cylindrical shape. The second fibers are wound over an entire circumferential surface along a direction intersecting the axial direction of the cylindrical shape. The number of the first fibers per unit area in a tensile surface that is to mainly receive tensile stress upon a collision of a vehicle body is larger than the number of the first fibers per unit area in a compressive surface that is to mainly receive compressive stress upon the collision of the vehicle body.

7 Claims, 8 Drawing Sheets

FIBER-REINFORCED RESIN COMPOSITE AND MANUFACTURING METHOD OF FIBER-REINFORCED RESIN COMPOSITE

CROSS-REFERENCE TO RELATED APPLICATIONS

The present application claims priority from Japanese Patent Application No. 2019-176137 filed on Sep. 26, 2019, the entire contents of which are hereby incorporated by reference.

BACKGROUND

The disclosure relates to a fiber-reinforced resin composite using a fiber-reinforced resin and a manufacturing method of the fiber-reinforced resin composite.

Recently, for the purpose of weight reduction of vehicles such as passenger vehicles, study has been made on manufacturing a center pillar and other structural members of a vehicle body using a fiber-reinforced resin that includes reinforcement fibers such as carbon fibers. A component made of the fiber-reinforced resin has high rigidity and, in particular, exhibits high strength with respect to tensile stress applied in an orientation direction of the fibers.

As one aspect of such a fiber-reinforced resin composite, there is an automobile shock absorber in which a plurality of flat surfaces and curved surfaces that constitute the composite are individually made of carbon fiber reinforced polymer (CFRP) materials having different strength characteristics. A fiber-reinforced resin sheet differs in strength characteristics obtained depending on an orientation direction of continuous fibers. Therefore, orientation directions of continuous fibers of fiber-reinforced resin sheets disposed on the surfaces that constitute the fiber-reinforced resin composite are varied to enable the surfaces to have individually different strength characteristics.

[Patent Literature 1] Japanese Unexamined Patent Application Publication No. 2005-225364

SUMMARY

An aspect of the disclosure provides a fiber-reinforced resin composite configured to be used for a vehicle body structure. The fiber-reinforced resin composite has a cylindrical shape and a longitudinal direction. The fiber-reinforced resin composite includes first fibers and second fibers. The first fibers are disposed along an axial direction of the cylindrical shape. The second fibers are wound over an entire circumferential surface along a direction intersecting the axial direction of the cylindrical shape. The number of the first fibers per unit area in a tensile surface that is to mainly receive tensile stress upon a collision of a vehicle body is larger than the number of the first fibers per unit area in a compressive surface that is to mainly receive compressive stress upon the collision of the vehicle body.

An aspect of the disclosure provides a manufacturing method of a fiber-reinforced resin composite having a cylindrical shape and configured to be used for a vehicle body structure. The manufacturing method includes repeating the followings the predetermined number of times in a predetermined order: disposing, on a core, a fiber-reinforced resin sheet comprising first fibers disposed along an axial direction of the cylindrical shape; and winding second fibers over an entire circumferential surface of the core along a direction intersecting the axial direction of the cylindrical shape. The manufacturing method includes curing a matrix resin with which at least the fiber-reinforced resin sheet is impregnated. The first fibers are disposed in such a manner that the number of the first fibers per unit area in a tensile surface that is to mainly receive tensile stress upon a collision of a vehicle body is larger than the number of the first fibers per unit area in a compressive surface that is to mainly receive compressive stress upon the collision of the vehicle body.

An aspect of the disclosure provides a manufacturing method of a fiber-reinforced resin composite having a cylindrical shape and configured to be used for a vehicle body structure. The manufacturing method includes repeating the followings the predetermined number of times in a predetermined order: disposing first fibers impregnated with a first matrix resin on a core along an axial direction of the cylindrical shape; and winding second fibers impregnated with a second matrix resin over an entire circumferential surface of the core along a direction intersecting the axial direction of the cylindrical shape. The manufacturing method includes curing the first matrix resin and the second matrix resin. The first fibers are disposed in such a manner that the number of the first fibers per unit area in a tensile surface that is to mainly receive tensile stress upon a collision of a vehicle body is larger than the number of the first fibers per unit area in a compressive surface that is to mainly receive compressive stress upon the collision of the vehicle body.

An aspect of the disclosure provides a manufacturing method of a fiber-reinforced resin composite having a cylindrical shape and configured to be used for a vehicle body structure. The manufacturing method includes repeating the followings the predetermined number of times in a predetermined order: disposing first fibers on a core along an axial direction of the cylindrical shape; and winding second fibers over an entire circumferential surface of the core along a direction intersecting the axial direction of the cylindrical shape. The manufacturing method includes supplying a first matrix resin to the first fibers and a second matrix resin to the second fibers. The manufacturing method includes curing the first matrix resin and the second matrix resin. The first fibers are disposed in such a manner that the number of the first fibers per unit area in a tensile surface that is to mainly receive tensile stress upon a collision of a vehicle body is larger than the number of the first fibers per unit area in a compressive surface that is to mainly receive compressive stress upon the collision of the vehicle body.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

DETAILED DESCRIPTION

As a method of manufacturing a fiber-reinforced resin composite, a method has been known in which reinforcement fibers are continuously wound around a core or a fiber-reinforced resin sheet is wound around the core, and a matrix resin with which the reinforcement fibers are impregnated is cured to mold the fiber-reinforced resin composite. When the fiber-reinforced resin composite is manufactured by winding the reinforcement fibers or the fiber-reinforced resin sheet around the core, continuity of a cylindrical fiber-reinforced resin layer can be obtained to reduce a portion that may become a fracture origin upon a vehicle collision, for example.

However, by the method of simply winding the reinforcement fibers or the fiber-reinforced resin sheet, all of circumferential side surfaces of the cylindrical fiber-reinforced resin layer have the same lamination configuration, which hinders appropriate implementation of intended characteristics of the individual side surfaces. For example, as the fiber-reinforced resin composite used for a vehicle body structure, there are components having one side surface intended to have strength with respect to tensile stress and another side surface intended to have strength with respect to compressive stress. However, with the same lamination configuration, there may be a side surface having insufficient strength or excessive strength.

It is desirable to provide a fiber-reinforced resin composite and a manufacturing method of the fiber-reinforced resin composite that has a cylindrical shape and is formed by winding fiber-reinforced resin and a fiber-reinforced resin sheet around a core in such a manner that appropriate strength characteristics can be obtained with respect to tensile stress and compressive stress applied to side surfaces of the fiber-reinforced resin composite upon a collision of a vehicle.

Figure 1:
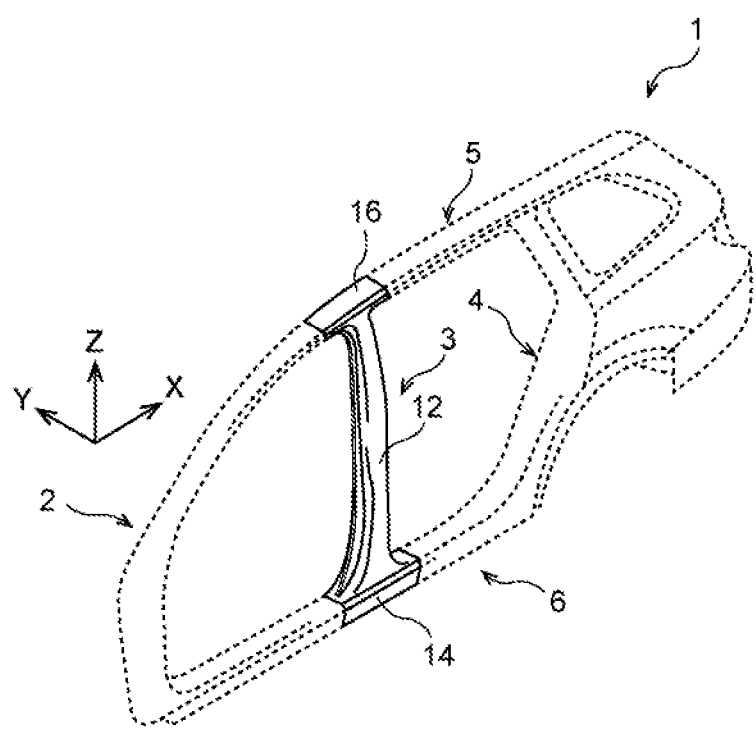
FIG. 1 is a schematic diagram illustrating an external appearance of a vehicle side body structure.
Figure 2:
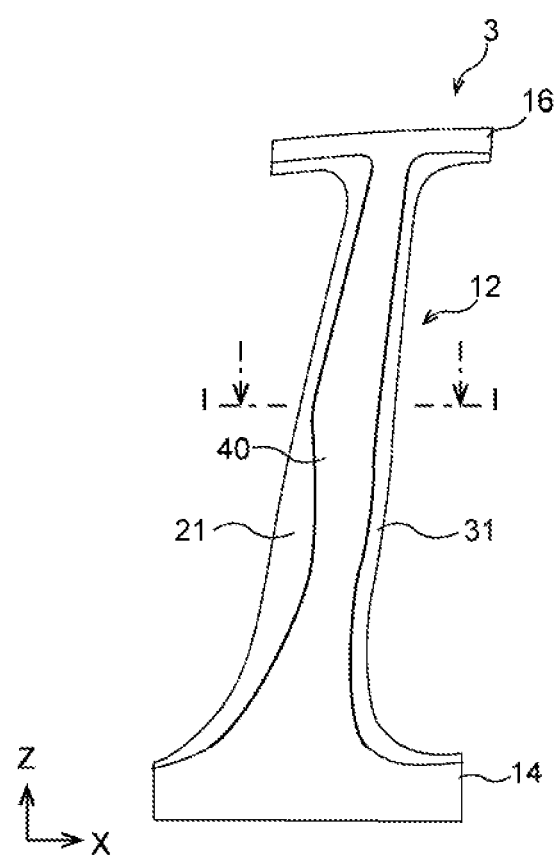
FIG. 2 is a schematic diagram illustrating a center pillar using a fiber-reinforced resin composite according to an embodiment of the disclosure, as viewed in a Y direction.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale Throughout the present specification and the drawings, elements having substantially the same function and configuration are denoted with the same numerals to avoid any redundant description. Fiber-Reinforced Resin Composite As an exemplary fiber-reinforced resin composite according to the embodiment of the disclosure, a center pillar using the fiber-reinforced resin composite will be described below. FIGS. 1 and 2 are diagrams illustrating the general arrangement, of a center pillar 3. FIG. 1 is a schematic diagram illustrating an external appearance of a vehicle side body structure 1. The vehicle side body structure 1 in FIG. 1 is a schematic illustration of a partial configuration of a left side portion of a vehicle. FIG. 2 is a diagram illustrating the center pillar 3, as viewed in a vehicle width direction from the outside of the vehicle. In this specification, as illustrated in FIGS. 1 and 2, occasionally, the vehicle width direction will be referred to as Y direction, a fore-and-aft direction of the vehicle (vehicle longitudinal direction) will be referred to as X direction, and a vehicle height direction will be referred to as Z direction.

The vehicle side body structure 1 includes, for example, a roof side rail 5, a rear pillar 4, a front pillar 2, the center pillar 3, and a side sill 6. The roof side rail 3 extends in the X direction in an upper portion of vehicle cabin space in the vehicle and forms a side portion of a roof of the vehicle. The side sill 6 extends along the X direction at a bottom of the side portion of the vehicle.

The front pillar 2 has a lower end coupled to a front end of the side sill 6 and has an upper end coupled to a front end of the roof side rail 5. The front pillar 2 forms a front portion that constitutes the vehicle cabin space in the vehicle and is positioned to support a side of a windshield. The rear pillar 4 has a lower end coupled to a rear end of the side sill 6 and has an upper end coupled to a rear end of the roof side rail 5. The center pillar 3 has a lower end coupled to a center portion of the side sill 6 in the X direction and has an upper end coupled to a center portion of the roof side rail 5 in the X direction.

An opening for a front door is defined in a region surrounded by the side sill 6, the side rail 5, the front pillar 2, and the center pillar 3. An opening for a rear door is defined in a region surrounded by the side sill 6, the side rail 5, the rear pillar 4, and the center pillar 3.

In the vehicle side body structure 1, the center pillar 3 has a longitudinal direction along the Z direction and has a substantially cylindrical shape. The center pillar 3 includes a roof-side-rail coupler 16 disposed on the upper end thereof, a side-sill coupler 14 disposed on the lower end thereof, and a pillar main body 12 located between the roof-side-rail coupler 16 and the side-sill coupler 14. In this embodiment, the center pillar 3 is molded using a fiber-reinforced resin.

The roof-side-rail coupler 16 and the side-sill coupler 14 of the center pillar 3 are each of a substantially cylindrical shape having an axial direction along the X direction. The pillar main body 12 is of a substantially cylindrical shape having an axial direction along the Z direction. The roof-side-rail coupler 36 and the side-sill coupler 14 may have either one of a hollow cylindrical shape and a solid cylindrical shape. The pillar main body 12 includes a cylindrical member 40 made as the fiber-reinforced resin composite according to this embodiment, and flanges 21 and 31 disposed on opposite sides of the cylindrical member 40 in the X direction. The flanges 21 and 31 are adhered to side surfaces of the cylindrical member 40 with an adhesive, for example. The flanges 21 and 31 function, for example, as components such as doorstops for the front door and the rear door. At least the cylindrical member 40 is a composite using the fiber-reinforced resin that includes reinforcement fibers impregnated with a thermoplastic resin or a thermosetting resin so as to implement, high strength and weight reduction.

Figure 3:
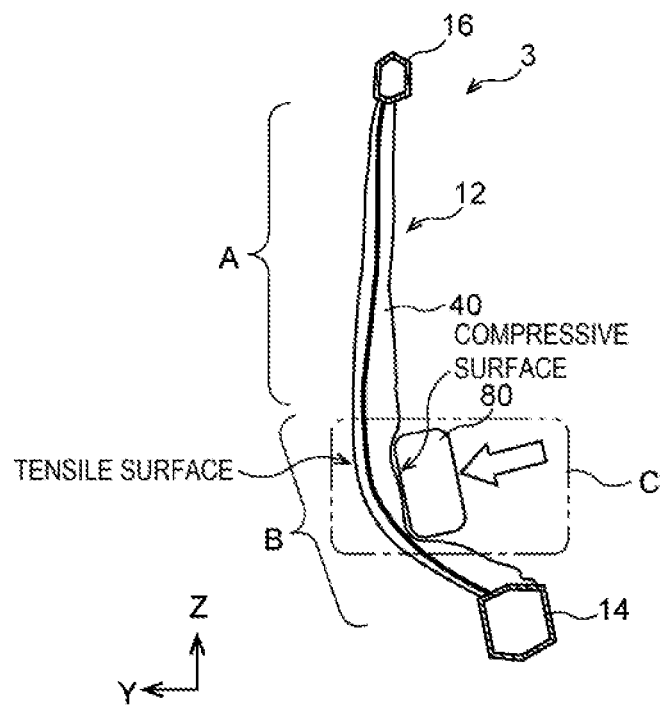
FIG. 3 is a diagram illustrating a state of the center pillar at the time of a side collision of a vehicle.

FIG. 3 is a diagram illustrating a state of the center pillar 3 at the time of a side collision of the vehicle. As illustrated in FIG. 3, a region (also referred to as "first region") A located at an upper portion of the pillar main body 12 is located above at least a predictive side-collision portion C that corresponds to a level of a passenger vehicle bumper. A region (also referred to as "second region") B located at a lower portion of the pillar main body 12 includes the predictive side-collision portion C. The first region A is less likely to be deformed than the second region B and functions to protect the head of a vehicle occupant upon a side collision. The second region B is more likely to be deformed than the first region A and functions to absorb a collision load that is input at the time of the side collision.

When the collision load is input to the pillar main body 12 upon the side collision of the vehicle, a side surface of the pillar main body 12 that is Located on a vehicle cabin side (inner side) becomes a tensile surface where tensile stress in the Z direction is mainly generated whereas a side surface of the pillar main body 12 that is located on a vehicle external side (outer side) becomes a compressive surface where compressive stress in the Z direction is mainly generated. When the collision load is input, both of a tensile field and a compressive field exist at two side surfaces coupling the side surface on the inner side and the side surface on the outer side to each other. In view of this, of the center pillar 3 according to this embodiment, the side surface of the pillar main body 12 on the outer side is mainly increased in strength with respect to the compressive stress. Meanwhile, the side surface of the pillar main body 12 on the inner side is mainly increased in strength with respect to the tensile stress.

Figure 4:
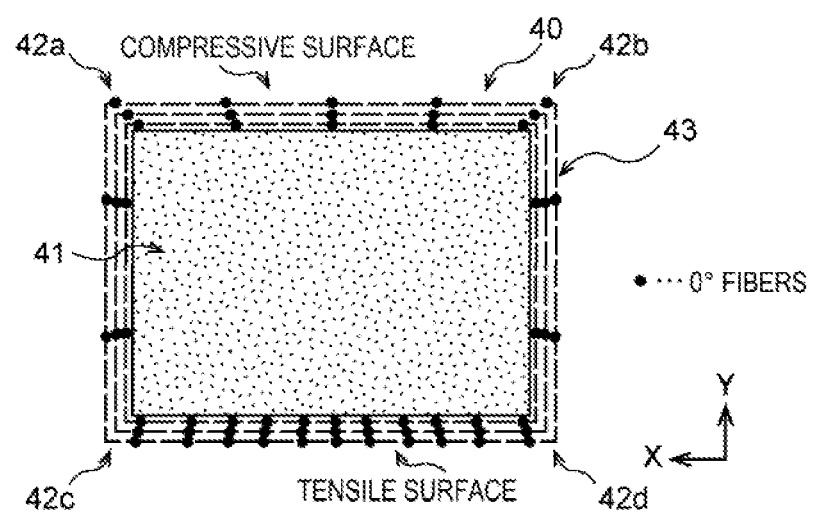
FIG. 4 is a cross-sectional view of a cylindrical member of the center pillar.
Figure 5:
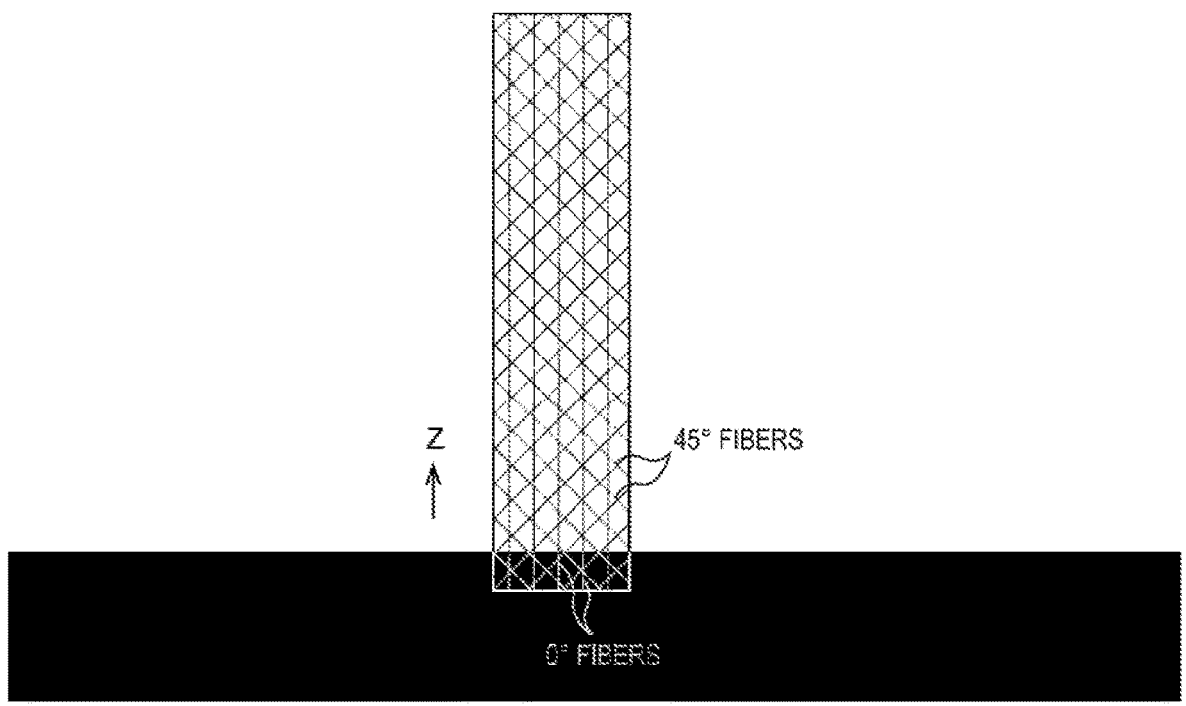
FIG. 5 is a side view of the cylindrical member of the center pillar.

FIGS. 4 and 5 are diagrams illustrating a configuration example of the cylindrical member 40 of the pillar main body 12. FIG. 4 is a cross-sectional view of the cylindrical member 40 of the pillar main body 12, taken along the line I-I in FIG. 2, as viewed in a direction indicated by the arrows. That is, FIG. 4 is a cross-sectional view of the second region B of the pillar main body 12. FIG. 5 is a side view of the cylindrical member 40 and illustrates a side surface that may become the compressive surface.

The cylindrical member 40 as the fiber-reinforced resin composite according to this embodiment includes a core 41 and a fiber-reinforced resin layer 43 disposed around the core 41. The core 41 is provided, for example, to enhance strength of the cylindrical member 40 or to facilitate molding of the cylindrical member 40. However, the functions are not limited in particular. Examples of the core 41 may include resin, metal, porous material, honeycomb structure material, and wood. It is noted that the center pillar 3 may not include the core 41.

The fiber-reinforced resin layer 43 is formed over an entire circumference of the core 41. Consequently, the cylindrical member 40 has a closed cross-sectional configuration. The fiber-reinforced resin layer 43 is formed by curing a resin including continuous fibers. The fiber-reinforced resin layer 43 may include staple fibers other than the continuous fibers. As a typical example of the continuous fibers, carbon fibers may be employed. However, other kinds of fibers are not excluded. Moreover, a combination of a plurality of kinds of fibers may be employed. In some embodiments, since carbon fibers have notable mechanical characteristics, the reinforcement fibers include carbon fibers.

A thermoplastic resin or a thermosetting resin is used as the matrix resin of the fiber-reinforced resin sheet. Examples of the thermoplastic resin may include polyethylene resin, polypropylene resin, polyvinyl chloride resin, acrylonitrile-butadiene-styrene copolymerized synthetic resin (ABS resin), polystyrene resin, acrylonitrile-styrene copolymerized synthetic resin (AS resin), polyamide resin, polyacetal resin, polycarbonate resin, polyester resin, polyphenylene sulfide (PPS) resin, fluororesin, polyetherimide resin, polyether-ketone resin, and polyimide resin.

As the matrix resin, one kind or a mixture of two or more kinds of these thermoplastic resins may be used. Alternatively, the matrix resin may be a copolymer of these thermoplastic resins. In the case of a mixture of the thermoplastic resins, a compatibilizing agent, may be added. Furthermore, as a flame retardant, a brominated flame retardant, a silicon-based flame retardant, red phosphorus, and such substances may be added to the thermoplastic resin.

Examples of the thermosetting resin may include epoxy resin, unsaturated polyester resin, vinyl ester resin, phenol resin, polyurethane resin, and silicon resin. As the matrix resin, one kind or a mixture of two or more kinds of these thermosetting resins may be used. In the case of using these thermosetting resins, a curing agent and a reaction accelerator may be suitably added to the thermosetting resins.

The fiber-reinforced resin layer 43 includes continuous fibers along an axial direction (Z direction) of the cylindrical member 40 (hereinafter also referred to as "0° fibers") and continuous fibers along a direction at plus or minus 45° with respect to the axial direction (Z direction) of the cylindrical member 40 (hereinafter also referred to as "45° fibers"). In FIG. 4, dashed lines indicate the 45° fibers, and black circles indicate cross sections of the 0° fibers. In one example, the 0° fibers may serve as "first fibers", and the 45° fibers may serve as "second fibers". In one embodiment, the Z direction along the axial direction may serve as a "first direction", and the direction at 45° with respect to the Z direction may serve as a "second direction". It is noted that although the second fibers are the 45° fibers, an inclination of an orientation direction of the second fibers with respect to the Z direction is not limited to plus or minus 45°.

The 45° fibers are wound over an entire circumferential surface of the cylindrical member 40. Therefore, the 45° fibers are disposed in such a manner that the number of the 45° fibers per unit area of any size is the same in all of the compressive surface located on the outer side, the tensile surface located on the inner side, and the two opposite side surfaces coupling the compressive surface and the tensile surface to each other. As illustrated in FIG. 4, the number of fibers per unit area means the number of fibers existing in a cross section of the compressive surface and the tensile surface that has a unit area of any size, as viewed in the axial direction of the cylindrical member 40.

The 45° fibers may be continuously wound around the core 41 by braiding and filament winding, and a fiber-reinforced resin sheet including the 45° fibers disposed in the matrix resin may be wound around the core 41. In some embodiments, the 45° fibers wound by the braiding and the filament winding seamlessly continue over the entire circumference of the core 41 to form continuity of the fiber-reinforced resin layer 43.

The cylindrical member 40 has a substantially rectangular cross-sectional shape and includes four ridges 42*a* to 42*d* (hereinafter collectively referred to as "ridges 42" unless particularly discriminated) along a longitudinal direction of the cylindrical member 40. The 45° fibers extend across the ridges 42 and intersect the ridges 42. This provides continuity of the fiber-reinforced resin layer 43 at the ridges 42 to prevent the ridges 42 from becoming a fracture origin when a collision load is input.

Concerning the 0° fibers, at least the number of the 0° fibers per unit area in the tensile surface located on the inner side is larger than the number of the 0° fibers per unit area in the compressive surface located on the outer side. In the cross section of the cylindrical member 40 illustrated in FIG. 4, the 0° fibers in the tensile surface have a larger density than the 0° fibers in the compressive surface. This makes it possible to relatively enhance strength of the tensile surface with respect to tensile stress in the Z direction without increasing the number of layers of the fiber-reinforced resin sheet including the 0° fibers. Since the compressive surface does not excessively include the 0° fibers, weight reduction of the cylindrical member 40 is not hindered. In the example illustrated in FIG. 4, the 0° fibers in the two opposite side surfaces that couple the compressive surface and the tensile surface have a density even lower than the 0° fibers in the compressive surface so as to provide intended strength characteristics and also implement further reduction of the weight of the cylindrical member 40.

The 0° fibers may be impregnated with the matrix resin, made different in density (the number), and disposed in the different side surfaces. Alternatively, the fiber-reinforced resin sheets including the 0° fibers different in density (the number) may be disposed on the different side surfaces. In some embodiments, the 45° fibers are wound on the outermost side of the fiber-reinforced resin layer 43. At a manufacturing stage of the cylindrical member 40, the 45° fibers are wound around the outermost surface so that the 0° fibers can be easily secured before the fiber-reinforced resin layer 43 is cured.

The number of the 0° fibers per unit area may be made different not only in accordance with individual characteristics of the side surface that may become the tensile surface, the side surface that may become the compressive surface, and the two opposite side surfaces that couple the tensile surface and the compressive surface but also in accordance with a region in each of the side surfaces where relatively high tensile stress is applied and a region in each of the side surfaces where relatively high compressive stress is applied when the collision load is input.

Figure 6:
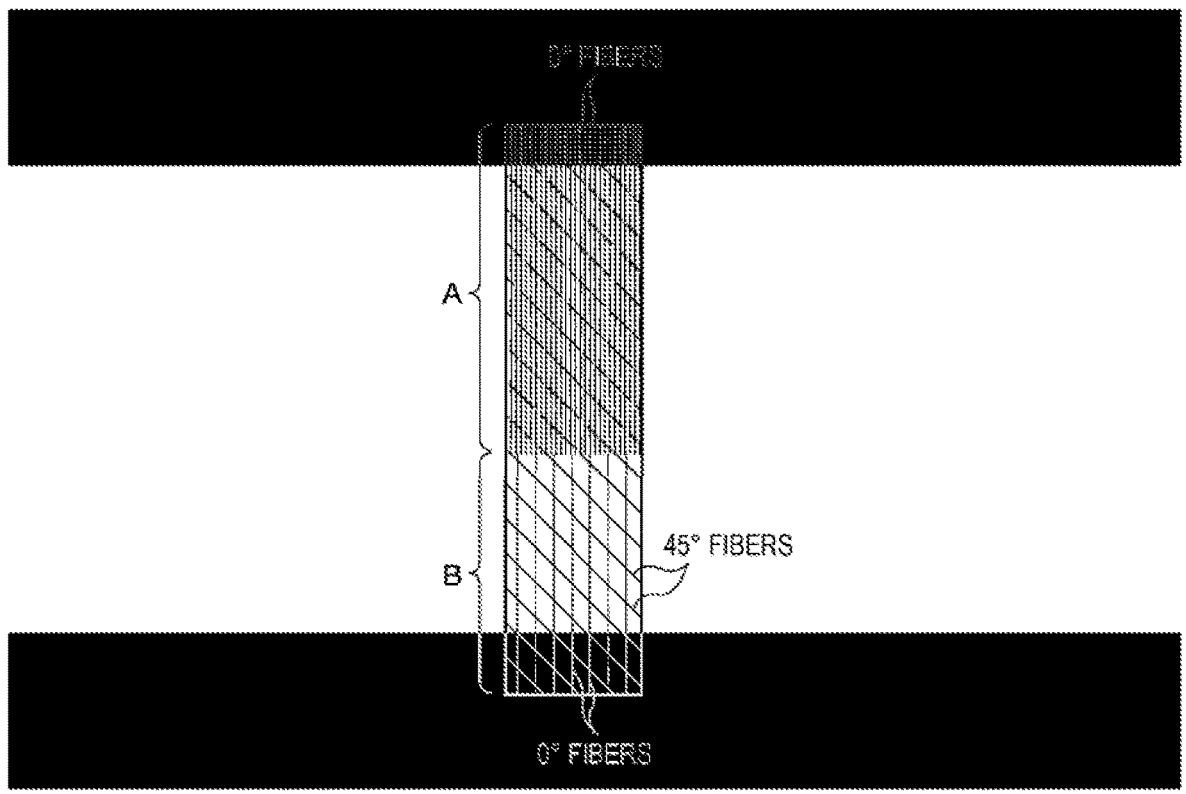
FIG. 6 is a diagram illustrating a configuration example of making the number of 0° fibers per unit area differ within a single surface.

FIG. 6 illustrates a configuration example of making the number of the 0° fibers per unit area differ within the side surface on the inner side that may become the tensile surface of the cylindrical member 40. In the example illustrated in FIG. 6, the first region A and the second region B of the pillar main body 12 in FIG. 3 are made to differ in the number of the 0° fibers per unit area.

As described above, the first region A of the pillar main body 12 functions to protect the head of a vehicle occupant upon a side collision. The second region B of the pillar main body 12 is more likely to be deformed than the first region A and absorbs a collision load that is input at the time of the side collision. In view of this, in the side surface of the cylindrical member 40 on the inner side, the number of the 0° fibers per unit area in the first region A is larger than the number of the 0° fibers per unit area in the second region B. Thus, strength of the side surface on the inner side in the first region A with respect to tensile stress can be made higher than strength of the side surface on the inner side in the second region B with respect to tensile stress so as to implement intended characteristics of the pillar main body 12.

Figure 7:
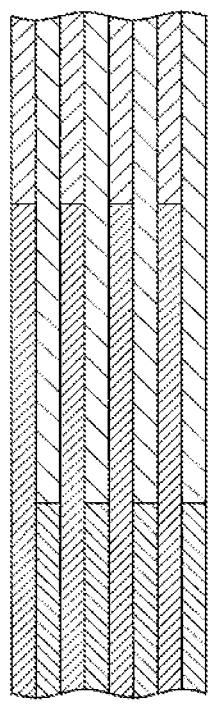
FIG. 7 is a diagram illustrating a configuration example of a joint portion of a fiber-reinforced resin laminate.

In some embodiments, as illustrated in FIG. 7, when the number of the 0° fibers per unit area is made to differ in different regions within the single side surface, a plurality of reinforcement fibers or fiber-reinforced resin sheets that constitute the different regions are alternately laminated one by one or two or more at a time in a joint portion of the regions having different numbers of the 0° fibers. Such lamination forms continuity in the joint portion so that an interface between the different regions can be prevented from becoming a fracture origin. A state of alternate lamination of the plural fiber-reinforced resin sheets is not limited to the example illustrated in FIG. 7.

In this manner, in the center pillar 3 including the cylindrical member 40 composed of the fiber-reinforced resin composite according to this embodiment, the number of the 0° fibers per unit area in the tensile surface that receives tensile stress in the Z direction when the collision load is input, is larger than the number of the 0° fibers per unit area in the compressive surface that receives compressive stress in the Z direction when the collision load is input. This makes it possible to obtain the cylindrical member 40 that has desired tensile strength and desired compressive strength and is reduced in weight without adding layers Including the 0° fibers to the tensile surface and without excessively providing the fibers for the compressive surface.

Manufacturing Method of Fiber-Reinforced Resin Composite

Next, description will be made on an exemplary manufacturing method of the cylindrical member 40 composed of the fiber-reinforced resin composite according to this embodiment.

First Manufacturing Method

A first manufacturing method of the cylindrical member 40 includes a step of repeating the following the predetermined number of times in a predetermined order: disposing, on the core 41, the fiber-reinforced resin sheets including the 0° fibers oriented along the Z direction; and winding the fibers over an entire circumferential surface of the core 41 along a direction intersecting the Z direction, and a step of curing the matrix resin impregnated in at least the fiber-reinforced resin sheet. In the first manufacturing method, the 45° fibers are wound around the core 41 by braiding, filament winding, and other methods.

Figure 8:
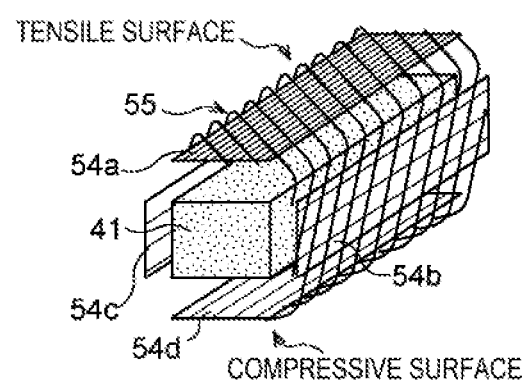
FIG. 8 is a diagram illustrating an exemplary first manufacturing method of a cylindrical member as the fiber-reinforced resin composite according to the embodiment.

FIG. 8 is a diagram illustrating the first manufacturing method of the cylindrical member 40. In FIG. 8, an upper surface of the core 41 corresponds to the side surface that may become the tensile surface, and a lower surface of the core 41 corresponds to the side surface that may become the compressive surface.

In the example illustrated in FIG. 8, fiber-reinforced resin sheets 54a to 54d including the 0° fibers are first disposed on outer-peripheral side surfaces of the core 41. At this time, the number of the 0° fibers per unit area at least in the fiber-reinforced resin sheet 54a disposed on the side surface that may become the tensile surface is larger than the number of the 0° fibers per unit area in the fiber-reinforced resin sheet 54d disposed on the side surface that may become the compressive surface. Each of the fiber-reinforced resin sheets 54a to 54d may be a single sheet or a laminate of plural sheets.

The fiber-reinforced resin sheets 54a to 54d may include not only the 0° fibers but also continuous fibers, such as the 45° fibers, that intersect the 0° fibers. In this case, in some embodiments, when the fiber-reinforced resin sheets 54a to 54d are disposed, some of the fiber-reinforced resin sheets 54a to 54d extend across the ridges (corners) of the core 41. Thus, the continuous fibers of the fiber-reinforced resin sheets 54a to 54d are disposed across the ridges of the core 41 so as to enhance continuity at the ridges. Consequently, when a collision load is input, the ridges can be prevented from becoming a fracture origin of the fiber-reinforced resin layer by stress applied to the ridges.

In the example illustrated in FIG. 8, the four individual fiber-reinforced resin sheets 54a to 54d are disposed on the respective four side surfaces of the core 41. However, the fiber-reinforced resin sheets that continuously extend over two or all of the side surfaces may be wound around the core 41. In this case, in accordance with desired strength characteristics of the individual side surfaces, the fiber-reinforced resin sheets partly different in density (the number) of the 0° fibers are employed in such a manner that the number of the 0° fibers per unit area at least in the fiber-reinforced resin sheet 54a disposed on the side surface that may become the tensile surface can be made different from the number of the 0° fibers per unit area in the fiber-reinforced resin sheet 54d disposed on the side surface that may become the compressive surface.

After the fiber-reinforced resin sheets 54a to 54d including the 0° fibers are disposed around the core 41, the continuous fibers (45° fibers) impregnated with the matrix resin are continuously wound around the core 41 by braiding, filament winding, and other methods. Thereafter, the core 41 on which the fiber-reinforced resin laminate is formed is introduced into a mold, and the fiber-reinforced resin laminate is cured under pressure to mold the cylindrical member 40.

Figure 9:
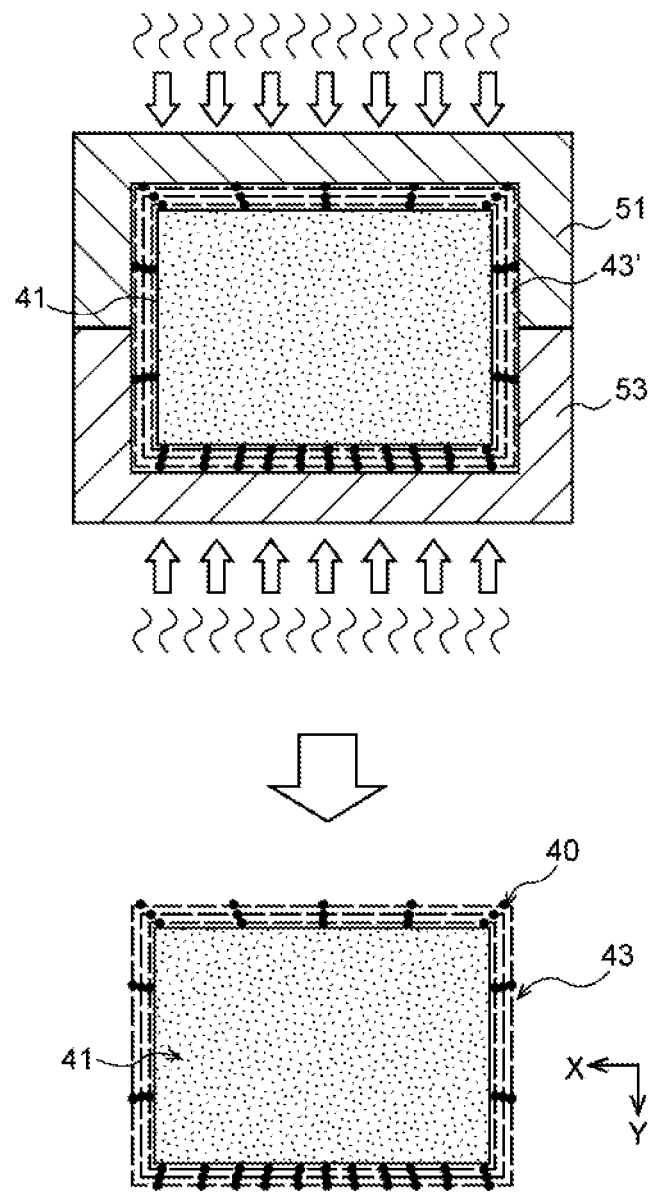
FIG. 9 is a diagram illustrating an example of forming a fiber-reinforced resin layer by hot press molding.

FIG. 9 is a diagram illustrating a molding method of the cylindrical member 40. FIG. 9 illustrates an example of forming the fiber-reinforced resin layer 43 by hot press molding using the fiber-reinforced resin sheet including the thermosetting resin as the matrix resin. In the case of forming the fiber-reinforced resin layer 43 using the fiber-reinforced resin sheet that includes the thermosetting resin and the continuous fibers, for example, hot press molding may be adopted. As illustrated in FIG. 9, the core 41 around which a fiber-reinforced resin laminate 43' is laminated is introduced into dies 51 and 53 and heated under pressure to mold the cylindrical member 40 as the fiber-reinforced resin composite.

Figure 10:
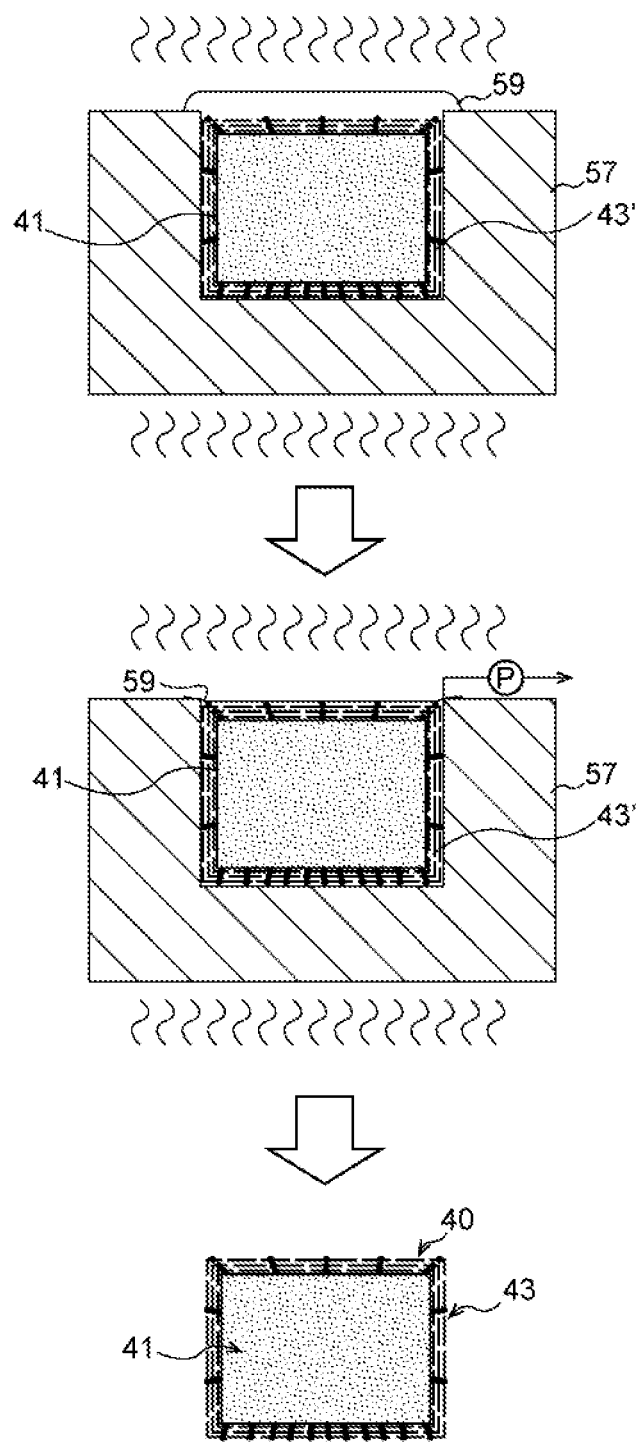
FIG. 10 is a diagram illustrating an example of forming the fiber-reinforced resin layer by autoclave melding.

Alternatively, in the case of forming the fiber-reinforced resin layer 43 using the fiber-reinforced resin sheet that includes the thermosetting resin and the continuous fibers, autoclave molding, for example, may be adopted. FIG. 10 illustrates an example of forming the fiber-reinforced resin layer 43 by autoclave molding using the fiber-reinforced resin sheet that includes the thermosetting resin as matrix resin.

As illustrated in FIG. 10, after the core 41 around which the fiber-reinforced resin laminate 43' is formed is introduced into a mold 57 and tagged, an interior of a bag 59 is made vacuous and heated in an autoclave apparatus to cure the fiber-reinforced resin laminate 43'. Thus, the cylindrical member 40 of a desired shape can be molded.

Second Manufacturing Method

A second manufacturing method of the cylindrical member 40 includes a step of repeating the following the predetermined number of times in a predetermined order: disposing the 0° fibers impregnated with the matrix resin on the core 41 along the Z direction; and winding the 45° fibers impregnated with the matrix resin over an entire circumferential surface of the core 41 along a direction intersecting the Z direction, and a step of curing the matrix resin.

Figure 11:
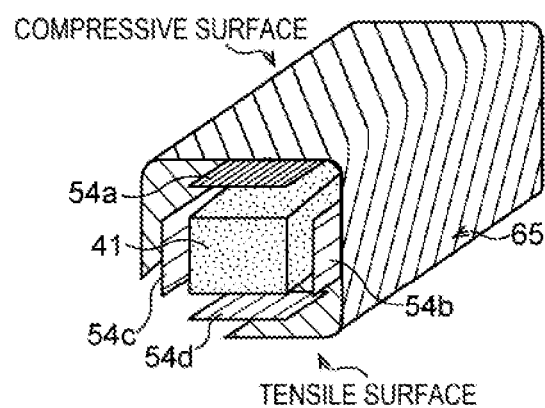
FIG. 11 is a diagram illustrating an exemplary second manufacturing method of the cylindrical member as the fiber-reinforced resin composite according to the embodiment.

FIG. 11 is a diagram illustrating the second manufacturing method of the cylindrical member 40. In FIG. 11, an upper surface of the core 41 corresponds to the side surface that may become the tensile surface, and a lower surface of the core 41 corresponds to the side surface that may become the compressive surface.

In the example illustrated in FIG. 11, in substantially the same manner as the first manufacturing method, the fiber-reinforced resin sheets 54a to 54d including the 0° fibers are first disposed on the outer-peripheral side surfaces of the core 41. At this time, the number of the 0° fibers per unit area at least in the fiber-reinforced resin sheet 54a disposed on the side surface that may become the tensile surface is larger than the number of the 0° fibers per unit area in the fiber-reinforced resin sheet 54d disposed on the side surface that may become the compressive surface. Each of the fiber-reinforced resin sheets 54a to 54d may be a single sheet or a laminate of plural sheets. The fiber-reinforced resin sheets including the 0° fibers may be disposed in substantially the same manner as the first manufacturing method.

After the fiber-reinforced resin sheets 54a to 54d including the 0° fibers are disposed around the core 41, a fiber-reinforced resin sheet 65 including the 45° fibers is further wound over an entire circumferential surface of the core 41. Thereafter, the core 41 on which the fiber-reinforced resin laminate is formed is introduced into a mold, and the fiber-reinforced resin laminate is cured under pressure to mold the cylindrical member 40. The cylindrical member 40 may be molded in substantially the same manner as the first manufacturing method.

In some embodiments, when the fiber-reinforced resin sheet 65 including the 45° fibers is disposed, end portions of the fiber-reinforced resin sheet 65 that are located in a circumferential direction of the outer peripheral surface of the core 41 are disposed at positions apart from the ridges (corners) of the core 41. With the end portions of the fiber-reinforced resin sheet 65 being not positioned at the ridges of the core 41, the ridges can be prevented from becoming a fracture origin of the fiber-reinforced resin layer 43 by stress applied to the ridges when a collision load is input.

Third Manufacturing Method

A third manufacturing method of the cylindrical member 40 includes a step of repeating the following the predetermined number of times in a predetermined order: disposing the 0° fibers on the core 41 along the Z direction; and winding the 45° fibers over an entire circumferential surface of the core 41 in a direction intersecting the Z direction, a step of supplying the matrix resin to the 0° fibers and the 45° fibers, and a step of curing the matrix resin.

Figure 12:
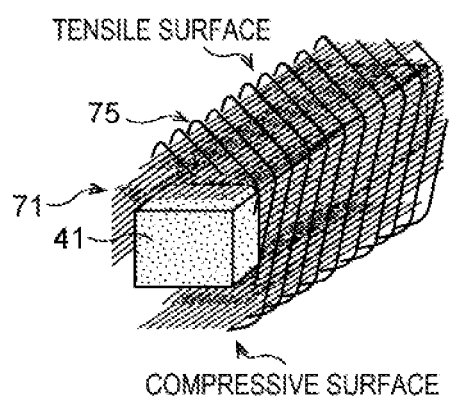
FIG. 12 is a diagram illustrating an exemplary third manufacturing method of the cylindrical member as the fiber-reinforced resin composite according to the embodiment.

FIG. 12 is a diagram illustrating the third manufacturing method of the cylindrical member 40. In FIG. 12, an upper surface of the core 41 corresponds to the side surface that may become the tensile surface, and a lower surface of the core 41 corresponds to the side surface that may become the compressive surface.

In an example illustrated in FIG. 12, 0° fibers 71 are disposed on the side surface of the core 41 that may become the tensile surface, the side surface of the core 41 that may become the compressive surface, and an entire circumferential surface of the core 41. At this time, the fibers 71 are disposed in such a manner that the number of the 0° fibers 71 per unit area in the side surface that may become the tensile surface is larger than the number of the 0° fibers 71 per unit area in the side surface that may become the compressive surface. Disposition of the 0° fibers 71 is not limited to a particular method and a particular order.

After the 0° fibers 71 are disposed around the core 41, 45° fibers 75 are further wound over an entire circumferential surface of the core 41 by braiding, filament winding, and other methods. Moreover, the 0° fibers 71 and the 45° fibers 75 disposed around the core 41 are supplied and impregnated with the matrix resin.

Thereafter, the core 41 on which the fiber-reinforced resin laminate is formed is introduced into a mold, and the fiber-reinforced resin laminate is cured under pressure to mold the cylindrical member 40. The cylindrical member 40 may be molded in substantially the same manner as the first manufacturing method.

In this manner, the fiber-reinforced resin layer 43 is formed by curing the fiber-reinforced resin sheet disposed around the core 41 so that the cylindrical member 40 as the fiber-reinforced resin composite according to this embodiment can be obtained.

As described above, in the fiber-reinforced resin composite according to this embodiment, the fiber-reinforced resin layer 43 includes the 0° fibers oriented along the axial direction of the cylindrical shape (Z direction) and the 45° fibers wound over the entire circumferential surface along the direction intersecting the Z direction, and the 0° fibers are disposed in such a manner that the number of the 0° fibers per unit area in the side surface that may become the tensile surface is larger than the number of the 0° fibers per unit area in the side surface that may become the compressive surface Therefore, appropriate strength characteristics can be obtained with respect to the tensile stress and the compressive stress applied to the individual side surfaces upon a collision of the vehicle.

In particular, in the side surface that may become the tensile surface, strength with respect to tensile stress in the Z direction is relatively enhanced without increasing the number of layers of the fiber-reinforced resin sheet including the 0° fibers. Since the compressive surface does not excessively include the 0° fibers, material cost can be decreased without hindering weight reduction of the cylindrical member 40.

In the manufacturing method of the fiber-reinforced resin composite according to this embodiment, the 0° fibers and the fiber-reinforced resin sheet are disposed around the core 41, and the 45° fibers are wound around the core 41 in such a manner that the number of the 0° fibers per unit area in the side surface that may become the tensile surface is larger than the number of the 0° fibers per unit area in the side surface that may become the compressive surface. Thus, the cylindrical member 40 as the fiber-reinforced resin composite according to this embodiment can be efficiently manufactured.

The embodiment of the disclosure has been described in detail above with reference to the accompanying drawings. The disclosure is not limited to such an embodiment. It is apparent that those who have ordinary knowledge in the technical field to which the disclosure pertains would conceive various changes and modifications within the scope of the appended claims, and it is to be understood that such changes and modifications also fall within the technical scope of the disclosure. Moreover, combinations of the embodiment with those changes and modifications likewise fall within the technical scope of the disclosure as a matter of course.

For example, in the above-described embodiment, the core 41 remains in the cylindrical member 40. However, the embodiment of the disclosure is not limited to such an example. The core 41 may be used during manufacturing the fiber-reinforced resin composite, and the core 41 may be removed after the manufacture.

The fiber-reinforced resin structural member used for the vehicle body structure and having the longitudinal direction is not limited to the center pillar but may be other structural members.

As has been described heretofore, the embodiment of the disclosure provides the cylindrical fiber-reinforced resin composite formed by winding the fiber-reinforced resin and the fiber-reinforced resin sheet around the core in such a manner that appropriate strength characteristics can be obtained with respect to the tensile stress and the compressive stress applied to the individual side surfaces upon a collision of the vehicle.

The invention claimed is:

1. A fiber-reinforced resin composite configured to be used for a vehicle body structure, the fiber-reinforced resin composite having a complex hollow shape and a longitudinal direction, the fiber-reinforced resin composite comprising:
   first fibers disposed along an axial direction of the complex hollow shape; and
   second fibers wound over an entire circumferential surface along a direction intersecting the axial direction of the complex hollow shape, wherein
   a number of the first fibers per unit area in a tensile surface that is to mainly receive tensile stress upon a collision of a vehicle body is larger than the number of the first fibers per unit area in a compressive surface that is to mainly receive compressive stress upon the collision of the vehicle body.

2. The fiber-reinforced resin composite according to claim 1, wherein one of the surfaces that form the complex hollow shape, the number of the first fibers per unit area in a region that is to receive relatively large tensile stress upon the collision of the vehicle body is larger than the number of the first fibers per unit area in a region that is to receive relatively small tensile stress upon the collision of the vehicle body.

3. The fiber-reinforced resin composite according to claim 1, wherein the second fibers are wound at least on the outermost side of the fiber-reinforced resin composite.

4. The fiber-reinforced resin composite according to claim 2, wherein the second fibers are wound at least on the outermost side of the fiber-reinforced resin composite.

5. A manufacturing method of the fiber-reinforced resin composite according to claim 1 and having the complex hollow shape and configured to be used for the vehicle body structure, the manufacturing method comprising:
   repeating the followings a predetermined number of times in a predetermined order:
      disposing, on a core, a fiber-reinforced resin sheet comprising the first fibers disposed along the axial direction of the complex hollow shape; and
      winding the second fibers over the entire circumferential surface of the core along the direction intersecting the axial direction of the complex hollow shape; and
   curing a matrix resin with which at least the fiber-reinforced resin sheet is impregnated, wherein
   the first fibers are disposed in such a manner that the number of the first fibers per unit area in the tensile surface that is to mainly receive tensile stress upon the collision the vehicle body is larger than the number of the first fibers per the unit area in the compressive surface that is to mainly receive compressive stress upon the collision of the vehicle body.

6. A manufacturing method of the fiber-reinforced resin composite according to claim 1 and having the complex hollow shape and configured to be used for the vehicle body structure, the manufacturing method comprising:
repeating the followings a predetermined number of times in a predetermined order:
disposing the first fibers impregnated with a first matrix resin on a core along the axial direction of the complex hollow shape; and
winding the second fibers impregnated with a second matrix resin over the entire circumferential surface of the core along the direction intersecting the axial direction of the complex hollow shape; and
curing the first matrix resin and the second matrix resin, wherein
the first fibers are disposed in such a manner the number of the first fibers per unit area in the tensile surface that is to mainly receive tensile stress upon the collision of a vehicle body is larger than the number of the first fibers per the unit area in the compressive surface that is to mainly receive compressive stress upon the collision of the vehicle body.

7. A manufacturing method of a fiber-reinforced resin composite according to claim 1 and having the complex hollow shape and configured to be used for the vehicle body structure, the manufacturing method comprising:
repeating the followings a predetermined number of times in a predetermined order:
disposing the first fibers on a core along the axial direction of the complex hollow shape; and
winding the second fibers over the entire circumferential surface of the core along the direction intersecting the axial direction of the complex hollow shape;
supplying a first matrix resin to the first fibers and a second matrix resin to the second fibers; and
curing the first matrix resin and the second matrix resin, wherein
the first fibers are disposed in such a manner that the number of the first fibers per unit area in the tensile surface that is to mainly receive tensile stress upon the collision of the vehicle body is larger than the number of the first fibers per the unit area in the compressive surface that is to mainly receive compressive stress upon the collision of the vehicle body.

* * * * *